United States Patent [19]
Howell

[11] Patent Number: 5,793,552
[45] Date of Patent: Aug. 11, 1998

[54] METHOD AND APPARATUS FOR HIGH SPEED SEARCHING IN ARCUATE SCAN TAPE DRIVES

[75] Inventor: Jones V. Howell, Newport Beach, Calif.

[73] Assignee: Seagate Technology, Inc., Scotts Valley, Calif.

[21] Appl. No.: 926,572

[22] Filed: Sep. 4, 1997

Related U.S. Application Data

[63] Continuation of Ser. No. 557,791, Nov. 13, 1995, abandoned.

[51] Int. Cl.$^6$ ................................... G11B 15/18
[52] U.S. Cl. ................................... 360/72.2; 360/48
[58] Field of Search ........................... 360/70, 84, 48, 360/72.2, 77.12, 77.13

[56] References Cited

U.S. PATENT DOCUMENTS 4,636,886  1/1987  Schwarz ........................... 360/84

FOREIGN PATENT DOCUMENTS

WO 93/26005  12/1993  WIPO.

*Primary Examiner*—Andrew L. Sniezek
*Attorney, Agent, or Firm*—McDermott, Will & Emery

[57] ABSTRACT

An arrangement and method of searching a tape at high speeds for a specific recording location with an arcuate scanner includes passing recorded tape past a scanner at a speed significantly higher than a read/write speed. Since the reading by an arcuate scanner of search information recorded at approximately a centerline of a tape is the least affected by changes in speed, compared to information recorded at the top and bottom of a tape, the search information located approximately along the centerline of the recorded tape is read. A specific recording location on the tape is then determined from the search information read.

12 Claims, 6 Drawing Sheets

Figure 4
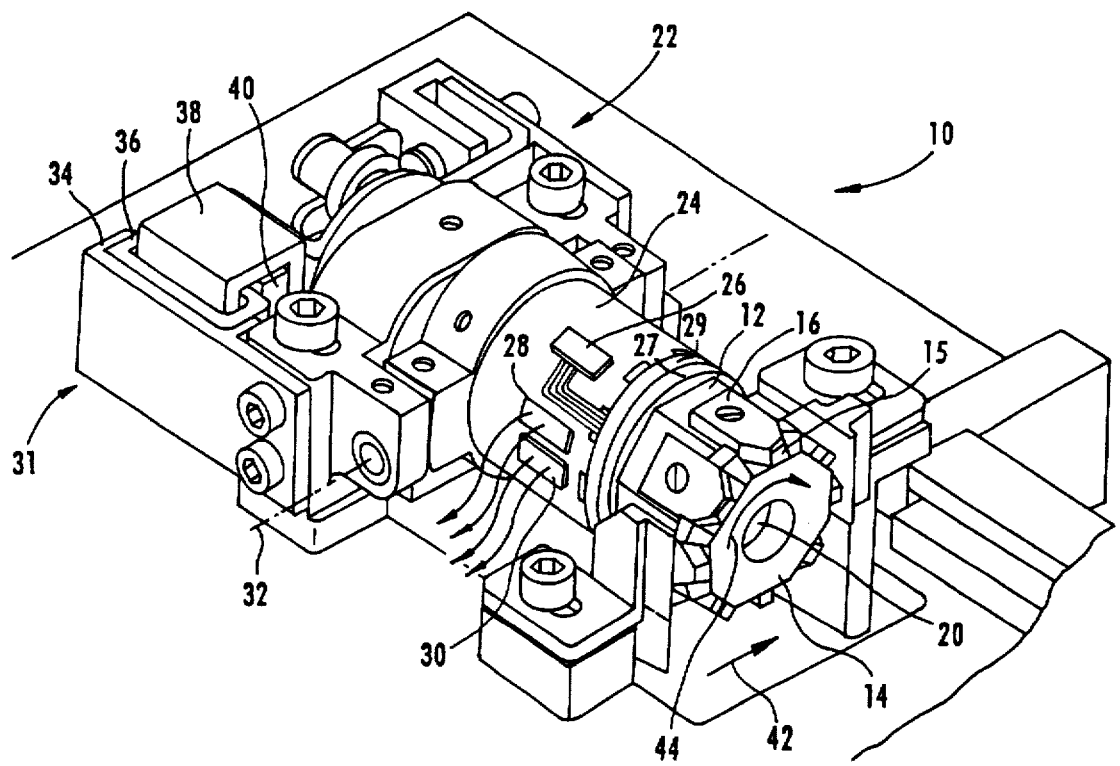
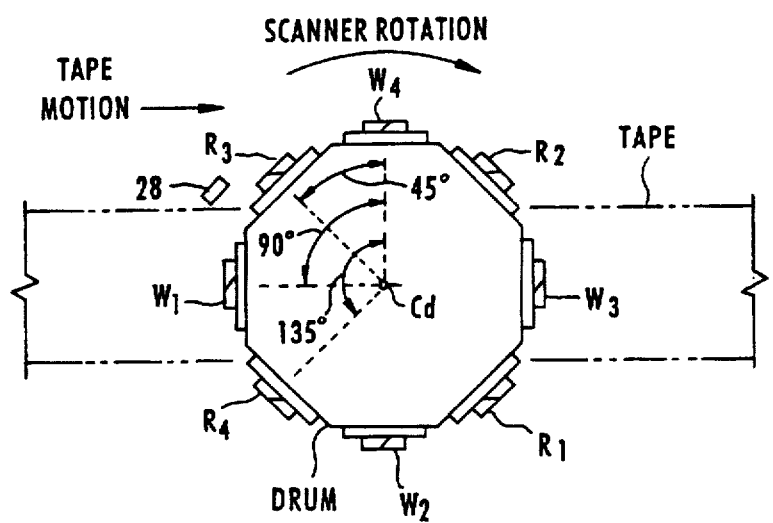
Figure 5

METHOD AND APPARATUS FOR HIGH SPEED SEARCHING IN ARCUATE SCAN TAPE DRIVES

This application is a continuation of application Ser. No. 08/557,791 filed Nov. 13, 1995 abandoned.

FIELD OF THE INVENTION

The present invention relates to the field of arcuate scan tape drives, and more particularly, to a method and apparatus for locating specified information on a recording tape at speeds significantly higher than data read/write speeds.

BACKGROUND OF THE INVENTION

Conventional magnetic tape drive systems provide a reel-to-reel transport of magnetic tape past a fixed recording/reading location where a stationary single track or multiple-track head is positioned. Recording and playback are performed longitudinally with respect to the tape by moving the tape on its longitudinal axis past the stationary record/playback head mechanism. In the stationary head tape drive, a plurality of transversely-aligned heads are fixedly positioned with respect to the tape during recording and playback. The recording heads place a plurality of parallel longitudinally-extending tracks on the tape.

Data is recorded on these conventional recording tape drives in "blocks" of a convenient size (user defined block) as determined by the computer operating system. Blocks are grouped together to form "files" separated by file marks. Files are grouped together to form "sets" separated by set marks to indicate a set of files recorded together in one recording session. An indication of the end of recorded data (EOD) of the last recording session is typically identified by an end of recording mark. Groupings and marks such as these are used to allow a tape to be searched for a particular data block or other information at speeds that are significantly higher than read/write speeds.

In a specific example of a tape drive, known as a quarter inch cartridge (QIC) drive, error correcting codes (ECC) are used to allow an increase in linear recording densities and narrower recording tracks. Gaps between blocks are eliminated to increase the tape drive capacity. Each fixed size "drive data block" contains a "block ID field" which defines the "user data block" and its size. A user data block could therefore comprise an integral number of drive data blocks plus a fraction of a drive data block. The block ID field defines the type of block which could be a data block, ECC block, file mark block, set mark block, end of recorded data block, etc. In addition, information indicating logical block count, file mark count, set mark count, and recording count up through that frame are dispersed among the block ID fields for the frame. A "recording count" is a quantity that is incremented when recording on the tape is started from the beginning of the tape. Everything that is recorded in that session from the beginning of the tape has the same recording number. The recording count is dispersed among the block headers in a frame.

In a QIC tape drive, one bit wide tracks are recorded by a single channel head. The recording head is stepped in small steps from one track to the next to achieve 40 tracks on a ¼ inch wide tape. A serpentine method of recording is used where half the tracks were recorded in the forward and half in the reverse direction. The recording and playback head is shown in FIG. 1 on a tape capable of recording 40 tracks. Recording begins by moving the tape to the beginning of the tape and the head is stepped to the first track. As the tape moves forward, the write head records user data and ECC data formatted into fixed size data blocks of 512 bytes and fixed size frames of 52 data blocks and 12 ECC blocks as shown in FIG. 2. When the end of the first track is reached, the tape is stopped and the head is stepped to the first reverse track and recording continues in the reverse direction. Recording in this manner continues until all the user data is recorded or until all 40 tracks are recorded. With cartridges containing 750 ft. of tape, capacities of 2 Gigabytes are achieved.

A high speed search to the EOD (end of data) on the QIC tape drive is accomplished by scanning tracks near the beginning of the tape for data content. For example, track 20 could be checked first, and if the recording count matches the recording count from track 1 (indicating that track 20 contained the same recording count as track 1), then track 30 would be checked. Otherwise, track 10 would be checked. By checking a maximum of 6 tracks, the track containing the end of data (EOD) could be located and only that track would need to be read to locate the recording head to the end of data.

To search for other data before the end of data (EOD), the QIC tape drive is responsive to the command "SKIP FORWARD N FILE MARKS". The QIC tape drive performs a track scan as described above for the EOD, but this time to locate the track that contains N more file marks than the current track. Similar methods are used to implement "SKIP REVERSE N FILE MARKS", "SKIP FORWARD N SET MARKS", and "SKIP REVERSE N SET MARKS". Since, on the average, only half of a track needs to be read, search at speeds of up to 80 time the read/write speeds are achieved.

Another known type of magnetic recording scanning technology is arcuate scan technology. In arcuate scanning, read and write scanner heads are mounted near the periphery of a circular planar surface and rotated thereon about an axis passing through the center of the circular surface and through the plane of a longitudinally-moving tape. In writing data on a tape, arcuate scanners produce a sequence of arcuately-shaped tracks which are transverse to the longitudinal axis of the tape, as shown in FIG. 3. An example of an arcuate scanning tape drive is disclosed in International Application WO 93/26005 to Lemke et al., and the disclosure thereof is expressly incorporated herein entirely by reference.

There has been no adequate method for performing high speed searches on tapes using arcuate scanner technology, in part due to the different manner in which the tracks are recorded on the tape. In longitudinal recording, a head can be can be jumped over a number of tracks to a new track, to quickly move to a different data location much later or earlier recorded than the present location. In arcuate scanning recording, by contrast, the individual arcuate tracks extend across the tape. It is necessary to actually move the tape a significant amount in order to access a much later or earlier recorded data location. When the tape is moved at high speeds, it is difficult for the read channel to recognize the data picked up by the read heads at the top and bottom of the recording tape, since this data has an added speed component relative to the read head due to the arcuate layout of the data track.

There is therefore a need for performing a high speed search in an arcuate scan tape drive that will adequately recognize information sufficient to determine the recording location on a tape when the tape is moved past the scanner at high speed.

SUMMARY OF THE INVENTION

This and other needs are met by the present invention which provides an arrangement and a method of searching a tape at high speeds for a specific recording location with an arcuate scanner. This method includes passing recorded tape past a scanner at a speed significantly higher than a read/write speed, reading search information located approximately along a centerline of the recorded tape, and determining a specific recording location on the tape from the search information read.

The reading by an arcuate scanner of search information recorded at approximately the centerline of a tape is the least affected by changes in speed, compared to information recorded at the top and bottom of a tape. The search information may be a very short record, but still be recoverable by the read channel, even when the tape is passed by the scanner at speed significantly higher that the read/write speed. The present invention therefore provides high speed scanning capability to arcuate scanning technology.

The foregoing and other features, aspects and advantages of the present invention will become more apparent from the following detailed description of the present invention when taken in conjunction with the accompanying drawings.

BRIEF DESCRIPTION OF THE DRAWINGS

FIG. 4 is a diagram of an arcuate scanner of a tape drive, operating in accordance with an embodiment of the present invention.

FIG. 5 is front view of the arcuate scanner head assembly, of the scanner of FIG. 4, showing the angular relationship of the read and write heads and the passage of a tape past the head assembly.

DETAILED DESCRIPTION OF THE ILLUSTRATIVE EMBODIMENTS

Figure 1:
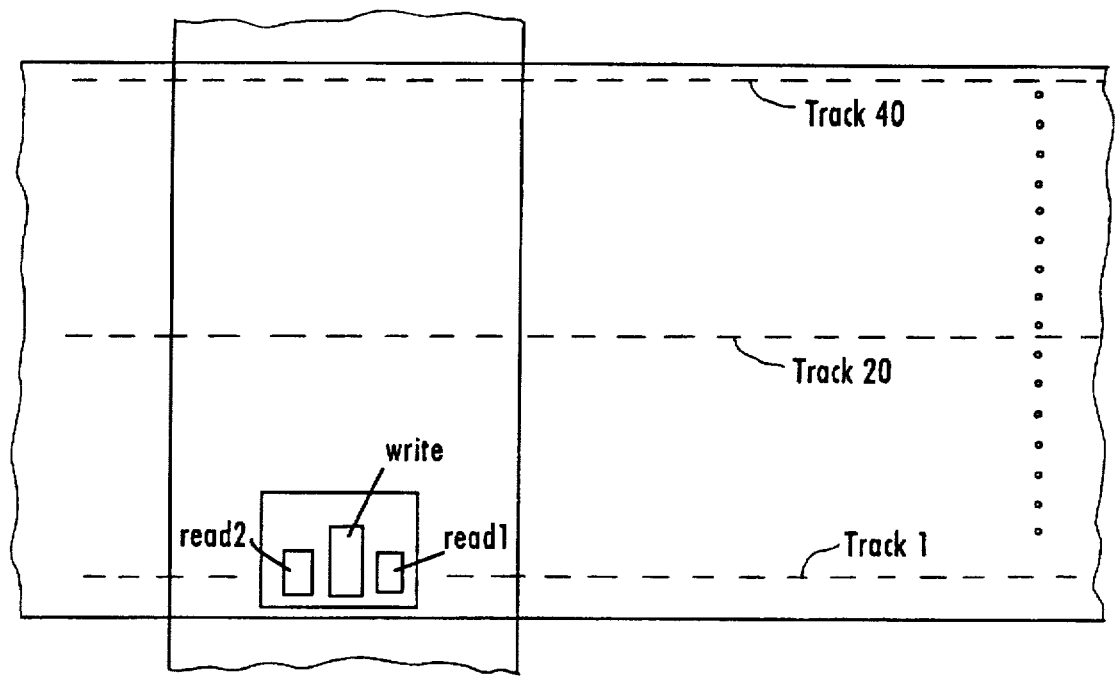
FIG. 1 is a schematic diagram of a prior art longitudinal tape drive recording head and a recording tape.
Figure 2:
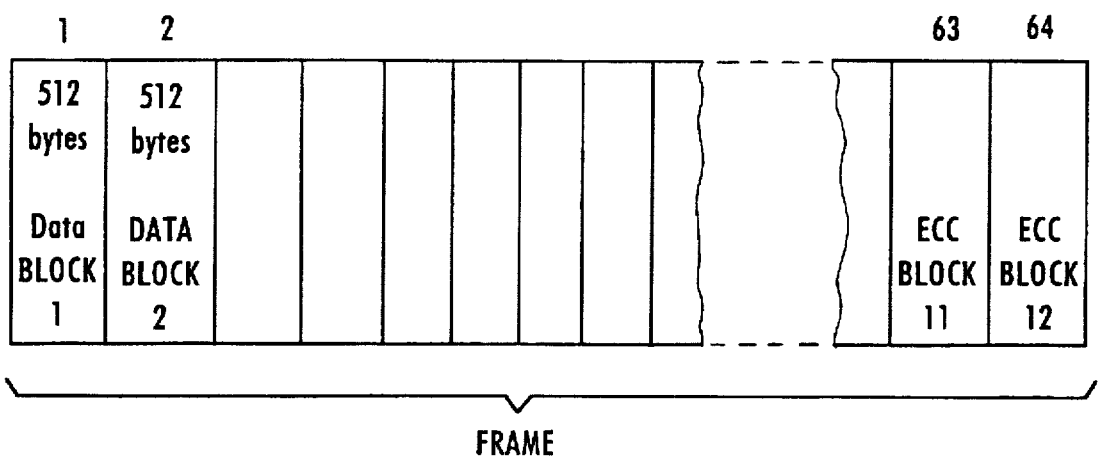
FIG. 2 is a block diagram of a prior art data format.

FIG. 4 depicts a perspective view of an arcuate scanner head assembly (ASHA) 10 which writes and reads a sequence of arcuate tracks on a recording tape. The scanner 10 has a drum 12 with an end face 14 at which a plurality of read and write transducers are mounted on support blocks 16. A magnetic transducer 15 is mounted at the forward tip of each support block 16. The drum 12 is rotated by a rotatable shaft 20 which is mounted for rotation in a motor/bearing assembly, generally indicated by reference numeral 22. Electrical signals are transferred to and from the transducers on the drum 12 by a conventional rotary transformer assembly having a rotary piece 27 and a stator piece 29. The drum 12 (with the rotor) is fixed to rotate with the shaft 20. The housing 24 and stator are stationary with respect to the shaft 20. As the shaft 20 rotates together with the rotor and drum 12, electrical signals are written to and read from arcuate tracks on the recording tape by a signal path which includes the electromagnetic flux couplings between the rotor and stator of the rotary transformer. The housing 24 is essentially cylindrical and encloses the structure providing rotational power to the shaft 20.

The windings of the stator connect to wiring pads, one of which is shown as reference numeral 26 on the outer surface of the motor/bearing housing 24. The wiring pads 26 provide electrical connection through wiring to circuit elements.

Sensors 28 and 30 are also mounted to the housing 24 and provide, respectively, an index signal and a shaft rotational speed signal for each full rotation of the shaft 20.

Two different types of angles are critical to proper reading and writing operations in arcuate scanners are discussed herein. The first type of angle relates to various rotational angles, i.e. of the various scanner heads, about the central axis of the arcuate scanner head assembly. Commutation functions are controlled as a function of the rotational angle relative to the index. The other critical angle is the tilt angle of the arcuate scanner head assembly. The tilt angle affects the alignment of the scanner with the tape.

The scanner 10 is positioned at a recording location so that the planar end face 14 of the drum 12 faces a tape on which a sequence of arcuate tracks is to be written or read. The end face 14 is adjusted with respect to the edges of the tape by pivoting the housing 24, and with it the drum 12, about a pivot axis 32. The tape moves past the end face 14 in a direction indicated by arrow 42 and the drum 12 rotates in the direction of arrow 44.

A tilt motor controls the angular tilting of the scanner 10 with respect to the tape. The tilt motor includes a stationary bracket 34 that carries on its rear portion a conventional voice coil 36 with an open center. A U-shaped bracket 38 is affixed to the rear end of the motor/bearing housing 24 by another U-shaped bracket (not illustrated). The U-shaped bracket 38 has one leg which is received in the center of the voice coil 36 and another leg to which a permanent magnet 40 is attached. Current through the voice coil 36 sets up a magnetic field in its open center which is conducted in the U-shaped bracket 36 to the permanent magnet 40. An electromotive force is exerted on the U-shape bracket 36 and its attached magnet 40 having a magnitude determined by the magnitude of the field induced in the coil 36. The scanner 10 pivots above the pivot axis 32 by an angular amount that depends upon the relative strengths of the voice coil 36 field and the field of the permanent magnet 40, thereby selectively positioning the axis of rotation on which the shaft 20 and drum 12 rotate.

The embodiment of the arcuate scanner depicted in FIG. 4 is exemplary only, as other specific arcuate scanner arrangements may be used with the present invention. For example, the tilt mechanism may be different in other embodiments, and the number of heads may also be different in other embodiments. The present invention has applicability to high speed searches by arcuate scanners in general.

FIG. 5 is a view through a tape at the reading location towards the planar end face of the ASHA scanner drum. As shown, there are eight transducers mounted with their active surfaces extending slightly through a plane at the end face of the drum. Four transducers are designated as write transducers and are identified as $W_1$, $W_2$, $W_3$ and $W_4$. In addition, there are four read transducers identified as $R_1$, $R_2$, $R_3$ and $R_4$. Identical subscripts identify write/read transducer pairs in which the track written by numbered transducer W is later read by correspondingly numbered transducer R. For example, the transducer $W_1$ writes a track that the transducer $R_1$ later reads.

Further, the write transducers are accurately spaced on the drum by 90° in the order in which they write tracks on the tape, which is $W_1$, $W_2$, $W_3$ and $W_4$. Similarly, the read transducers are spaced from each other by 90°, but are spaced from adjacent write transducers by 45°. Further, read transducer $R_1$ is displaced by 135° in the direction opposite the scanner rotation direction from write transducer $W_1$.

The sequence traced across the tape from edge to edge when the scanner rotates in the direction indicated in FIG. 5 is: $W_4$, $R_3$, $W_1$, $R_4$, $W_2$, $R_1$, $W_3$, $R_2$. Write heads $W_1$, and $W_3$ are oriented to write at a first azimuth angle on the tape, and read heads $R_1$ and $R_3$ read information recorded at the first azimuth angle. Write heads $W_2$ and $W_4$ are oriented to write at a second azimuth angle on the tape, and read heads $R_2$ and $R_4$ read information recorded at the second azimuth angle. As thus described, when the tape speed is matched to an appropriate rotational velocity of the drum, the write transducers, when energized, will trace a sequence of contiguous recorded arcuate tracks with alternating azimuthal orientation. Similarly, the read heads sense recorded information from a sequence of arcuate tracks with alternating azimuthal orientation.

Figure 3:
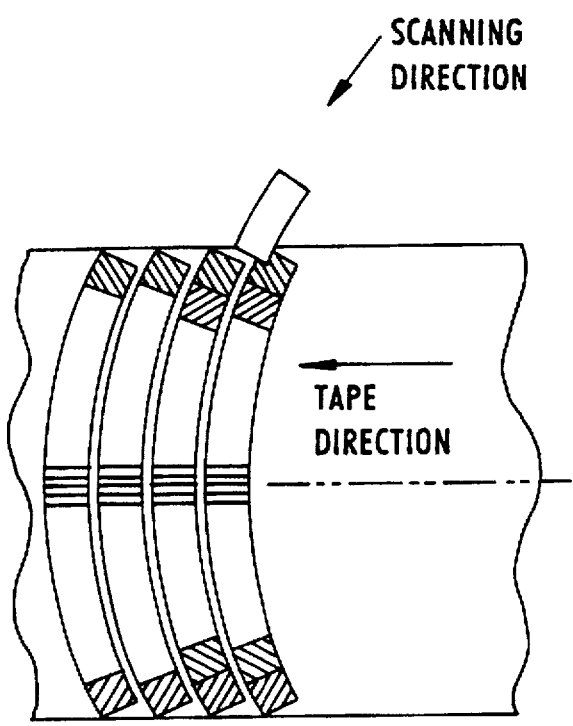
FIG. 3 is a diagram of a tape having arcuate tracks recorded on the tape.
Figure 6:
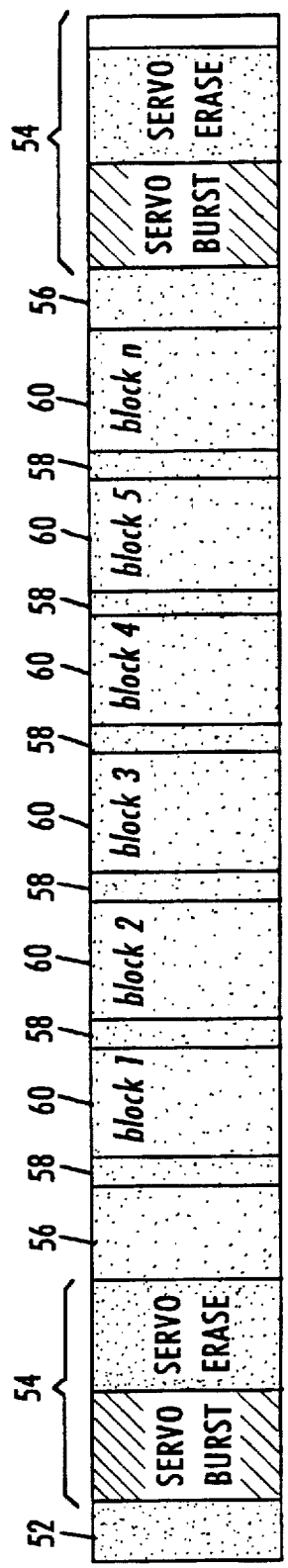
FIG. 6 is a block diagram of an arcuate track format in accordance with an embodiment of the present invention, depicted in a straight line.

FIG. 6 depicts a typical single track 50 written onto a recording tape in accordance with the present invention. The track 50 is illustrated in a straight line for ease of illustration and explanation, but actually forms an arc (see FIG. 3) as it is written onto the recording tape. The top of the track 50 is on the left hand side of FIG. 6, and the bottom of the track 50 is on the right hand side of FIG. 6.

The track 50 has a first pad (erase) region 52 that provides some small margin for the track 50. This region is followed by a servo region 54 that has a servo burst area and a servo erase area. In adjacent tracks, the order of the servo burst and servo erase areas within the servo region 54 are alternated, in certain embodiments of the invention. The servo region 54 is followed by another pad region 56. After this pad region 56, the data is recorded.

The data is recorded in blocks 60, with a format timing mark 58 preceding each of the data blocks 58. Six data blocks 60 of fixed size are recorded on each track 50. Although shown as separate in FIG. 6, the format timing marks 58 can also be considered to form part of the individual data blocks 60.

Error correction can be performed on the individual data blocks 60 to correct errors cause by electronic noise. These errors are typically one and two bytes long, and are considered one level of defect. However, media defects can also occur, in which the errors are longer, so that a second level of error correction is necessary. For this purpose, the data blocks are grouped together into "frames". The data blocks are logically grouped together in frames, with each frame containing 672 blocks, with 544 of these blocks containing data, and the remainder (128) of the blocks containing error correction code (ECC) parities.

User defined blocks are permitted and accounted for by building the user blocks starting at the beginning of a frame. At the same time, an information table is built at the end of a frame. The information table at the end of the frame indicates where the first block of the user defined block begins and how many bytes are in the user defined block. The second entry in the information table indicates where the second user block begins and how many bytes are in it. Counts are also kept of file marks that separate files from each other, as well as set marks that separate sets from each other. These form entries into the information table as well. The user format of user blocks with an information table at the end of a frame containing entries for file marks and set marks is similar to the way data is arranged on digital audio tape (DAT) drives, in which the frames are referred to as groups.

Figure 7:
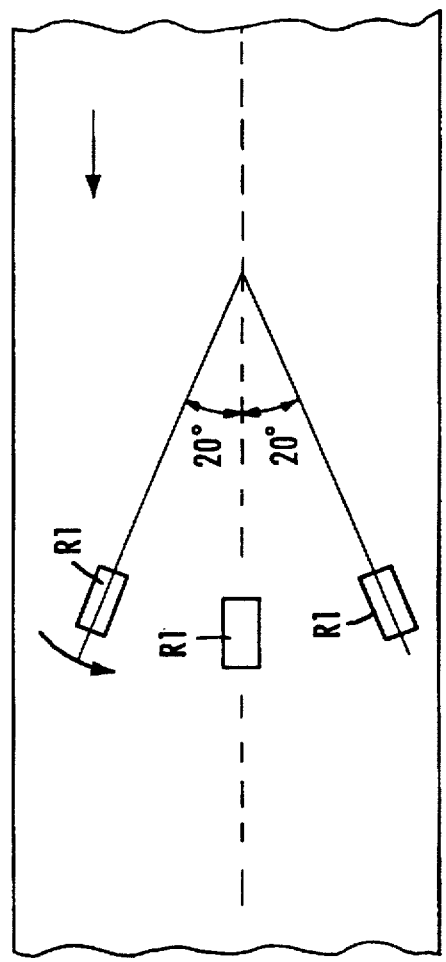
FIG. 7 is a schematic depiction of the orientations of a read head of an arcuate scanner with respect to a recording tape during a scan across the tape.

FIG. 7 depicts schematically a read head R1, for example, in its various positions as it scans across a recording tape in an arc, in the manner described earlier. The head R1 is tilted at an angle of approximately 20 degrees up in relation to the center of the tape at the top of the recording area on the tape, where recording is started. The head R1 is also tilted at an angle of approximately of 20 degrees down in relation to the center of the tape at the bottom of the recording area, where recording is stopped. The arc of the recording (and thus the track 50), is therefore approximately 40 degrees.

The ends of the arc (those portions closest to the top and bottom edges of the tape) are the regions of the data track 50 that are most affected by changes in the speed of the tape, as there is an angular speed component to the data located in these areas. Data recorded in the center of an arc is the least affected by higher tape speeds, as this portion of the track 50 is traveling perpendicular to the read head R1. Due to this fact, it is possible for a very short record located in the center of the tape to be read, even when the tape is moving at higher than the normal read/write speed.

The present invention takes advantage of this possibility by providing recorded special search information at approximately the center of the track 50, where it can be read by a read head and recognized by a read channel even when the recording tape is moving past the scanner head at speeds significantly faster than the read/write speed. By contrast, short records at the ends of an arc would pass by a read head at a speed which would be enormously changed by a change in the tape speed, and which a read channel would not be able to recognize.

Figure 8:
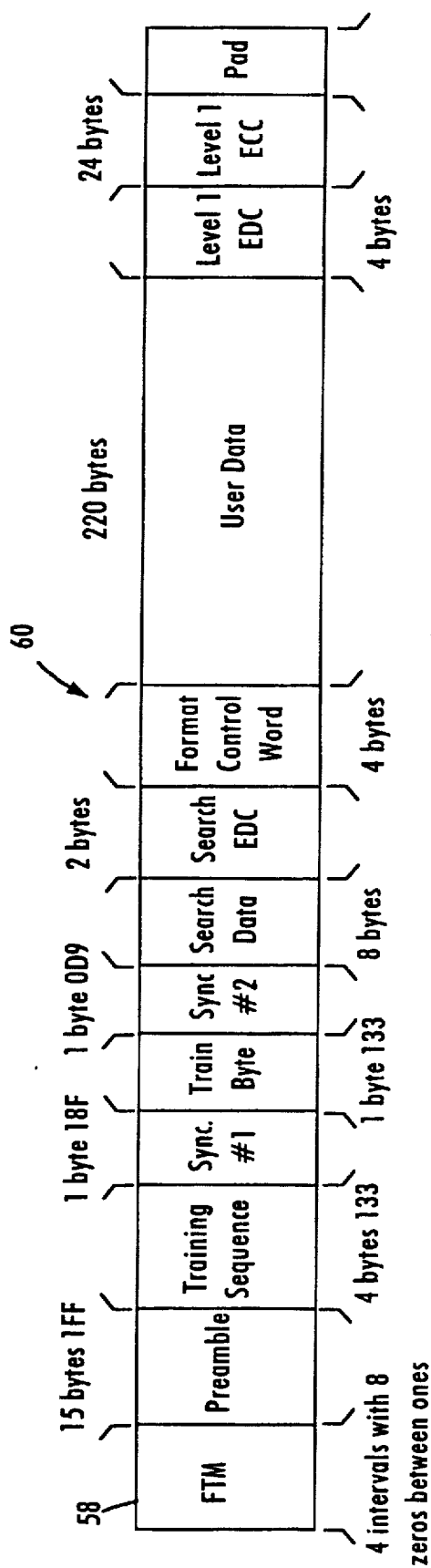
FIG. 8 shows the format of the digital information within the data blocks in the recorded format of FIG. 6.

In an embodiment of the present invention, each block of data 60 is provided with search information that may be used by the tape drive to perform a high speed search. An exemplary format of a data block 60 is illustrated in FIG. 8, where the first part of the data block 60 is a format timing mark. The format timing mark may comprise, for example, 4 intervals with 8 zeros between ones. It is this mark that the read channel is searching for when it is performing a high speed search, and is also used during reading of data at normal read/write tape speed. The format timing mark may be read asynchronously, and when recognized, causes the read channel to start processing a new block of data.

The next information recorded in each data block 60 is preamble information that allows the phase locked loop generator to lock up. A training sequence and synchronization and training bytes follow the preamble information. The training byte allows a filter in the read channel to optimize itself for that part of the tape. The synchronization bytes provide a "fault tolerance synchronization"with a separator byte (training byte) in the middle. The search information will be processed if either one of the two synchronization bytes are recovered.

The search data and search error detection code comprise 10 bytes of information, following the synchronization bytes. The 8 bytes of search data include the lower 3 bytes of the logical block or user block count, 2 bytes are the lower bytes of a file mark count, and 2 bytes are the lower bytes of a set mark count. One byte of the search data contains miscellaneous bits that can be used for different purposes, such as indicating the end of recorded data. The search error detection code includes two bytes that are used for error detection for the search data.

The format control word is 4 bytes of data that indicates the block number within a frame, the lower order 8 bits of a frame number, and the type of track. The block 60 includes 220 bytes of user data, followed by 4 bytes of error data correction and 24 bytes of error correcting code information for correction of the user data. The error correction code is used for everything in the data block except for the search data. At the end of the data block 60 is one byte of pad.

As the tape is moving in a high speed search, the minimum amount of information available in the 8 bytes of the search field is kept track of by a controller processor. A count of the complete user blocks is maintained and updated by the controller processor as the three bytes of data related to the user block count is received from the search data. Similarly, a complete file mark count and a complete set mark count are also maintained and updated. The complete user block count, the complete file mark count and the complete set mark count provide the controller processor with the information needed to know the current location of a recording on the tape.

The embodiment of the present invention described above records the search data information in every block. This has the advantage of presenting the read channel with a fixed number of bytes on every block, making the operation of the read channel somewhat easier. In these embodiments, therefore, the search data that is most likely to be read is that located at the beginning of block 4, as seen in FIG. 6. This search data is the most centrally located search data on the track 50.

In other embodiments of the present invention, the search data is not provided in every data block. In certain embodiments only the data block in the middle (such as block 4 in FIG. 6) is provided with the search data. This has the advantage of eliminating the redundant recording of the search data in each data block, but presents the disadvantage of making the data block in the middle have more bytes than the other data blocks, requiring a special handling of this data block.

Another embodiment of the present invention provides the search data in its own short block, separate from -the data blocks and located in the middle of the track. This embodiment again requires the read channel to treat the short search data block as a special case, but also has the advantage of not requiring the search data to be redundantly recorded in each data block.

With an arcuate scan tape drive, a 1 Megabyte/sec transfer rate and a capacity of 12 Gigabytes with 750 feet of ¼ inch tape and a recording density of 66,667 bits/inch (bpi) is achievable, when the read/write tape speed is 0.717 inches/sec (ips), the track pitch is 0.00075 inches, and the rpm of the scanner is 14335.

An exemplary range of search speeds may be determined by the following calculations. The read head needs to cover the 36 bytes (4 bytes of the format timing mark, 15 bytes of preamble, 4 training bytes, 3 synchronization bytes, 8 search field bytes, and 2 error detection code bytes) before the format control word and the user data in the data block. At a recording density of $73.8 \times 10_3$ flux transitions per inch (ftpi), the search field length (sf1) is (36)(9)/ftpi or sf1= 0.00439 in. At a head to tape speed of vh=457.4 ips, a search time ts=sf1/vh or ts=(9.598)(10$_{-6}$) second is required to pass over the search block. For a head width hw=0.0012 inches, and a track width tw=0.00075 inches, the tape can move a distance hw−tw=(4.5)(10$^{-4}$) inches in time ts=(9.598)(10$^{-6}$) seconds while the read head completely covers the search block. This lower bound on the search speed is then given by $v_{lower}$=(hw−tw)/ts or $v_{lower}$=46.883 ips, approximately 65 times faster than the read/write speed of 0.717 ips. The upper bound on the search speed occurs when the tape moves a distance 3tw−hw=0.00105 inches in time ts. This upper bound is given by $v_{upper}$=(3tw−hw)/ts or $v_{upper}$=109.395 ips, which is approximately 150 times faster than the read/write speed. In certain embodiments, the search speed is between these upper and lower bounds.

Figure 9:
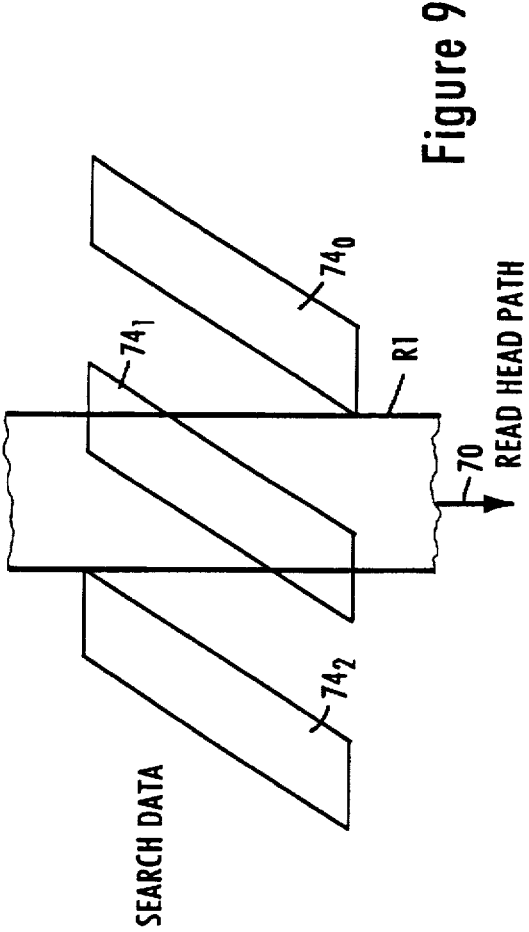
FIG. 9 schematically illustrates a read head in the process of reading search data at a high tape speed.

A schematic depiction of a read head and the search field is provided in FIG. 9. This depiction represents the fastest speed at which the recording tape may be moved that still allows the search data in the center of the tape to be recovered. In the center of its arc across the recording tape, the read head R1 is moving in the direction of arrow 70. The tape is moving in the direction of arrow 72. The search data $74_n$ will be distorted in approximately the shape shown in relation to the read head R1 due to the speed of the tape. The search data from three successive tracks (0,1,2) recorded by writing heads of the same azimuthal orientation are shown, the spaces between the search data representing search data from tracks recorded by heads with the opposite azimuthal orientation. The amount of distortion shown represents the upper bound since the search data regions are not yet distorted enough to overlap to the point where the read head R1 cannot read data from just a single search data region, $74_1$. If the tape speed were faster, then the search data regions $74_n$ would be angled more in relation to the read head R1 to cause it to be unable to read only one search data region at a time.

Figure 10:
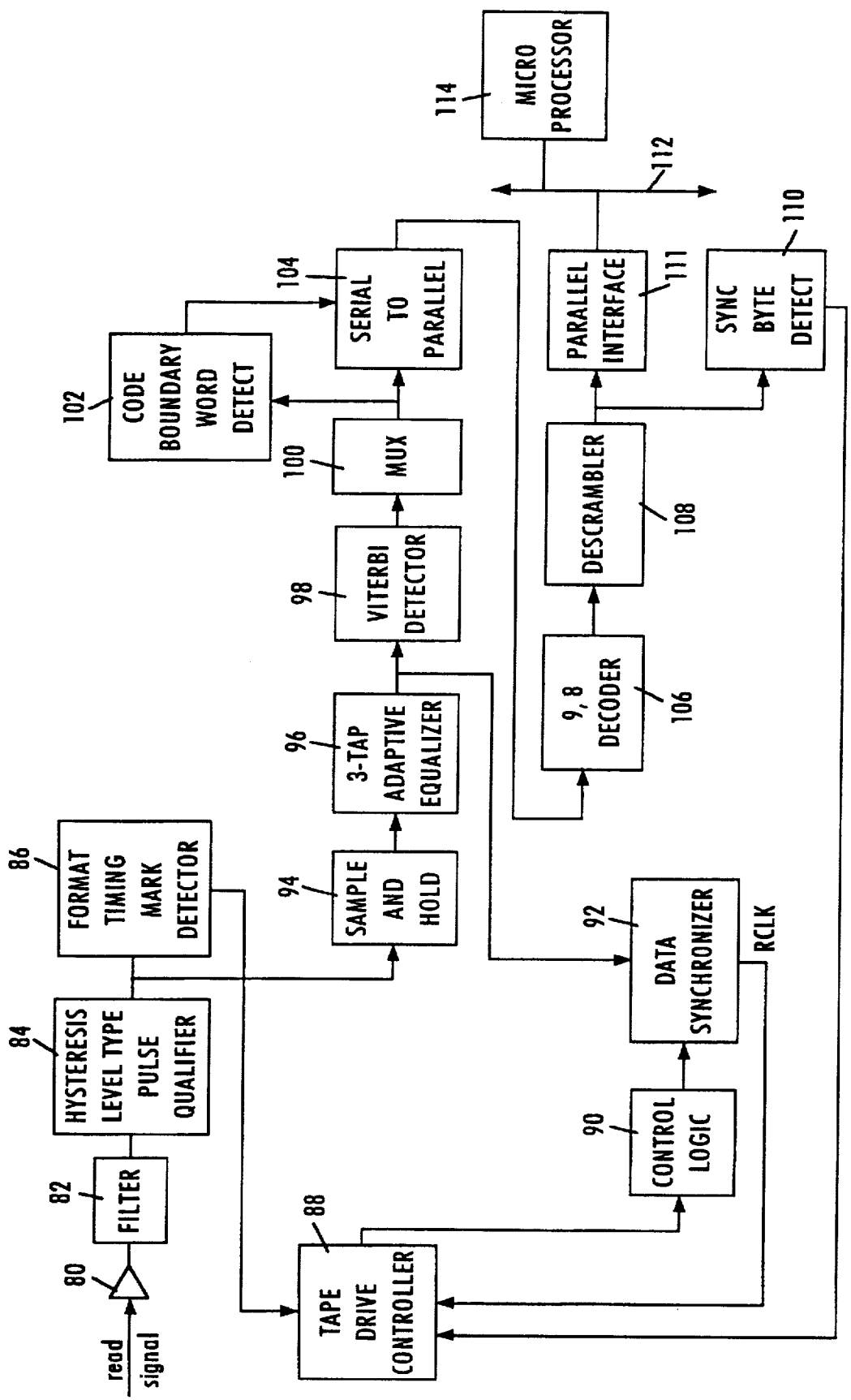
FIG. 10 is a block diagram of the read channel constructed in accordance with an embodiment of the present invention.

A block diagram of an exemplary embodiment of the detection circuitry is provided in FIG. 10. A read signal from the read head is amplified and filtered by an amplifier 80 and filter 82. The signal is passed through a hysteresis level type pulse qualifier 84 and then to a format timing mark detector 86. If the format timing mark is detected, a signal is sent to a tape drive controller 88, which asserts a control signal to read/write control logic 90.

The control logic 90 asserts a control signal to a data synchronizer 92 that has a phase locked loop to enter an acquire mode. The read signal should now represent the preamble information, which is passed through a sample and hold circuit 94 and a 3-tap adaptive equalizer 96. The data synchronizer uses the preamble bytes to establish the clocking. The data synchronizer then moves into a tracking mode.

The read signal, following the preamble bytes, contains training bytes. The read signal is passed through a viterbi detector 98 and a multiplexer 100 to a code word boundary detector 102 which uses the training bytes to establish the beginning and end of the byte boundaries. Following the training bytes in the read signal are the synchronization bytes. These pass through a serial to parallel converter 104 and are decoded by 9,8 decoder 106. The synchronization bytes are detected by a synchronization byte detector 110, which outputs a signal to the tape drive controller 88. The search data, which follows the synchronization bytes in the read signal, are then placed on a data bus 112 for use by a microprocessor 114 in determining the location in a recording.

With the method and apparatus of the present invention, a high speed search for locating specific information such as data blocks, file marks, and set marks at speeds significantly higher than data read/write speeds, is provided for arcuate scan tape drives.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of searching a tape at high speeds for a specific recording location with an arcuate scanner, comprising:

passing recorded tape having a plurality of arcuate tracks past a scanner at a speed significantly higher than a read/write speed wherein at least one of the plurality of arcuate tracks includes a plurality of formatted data blocks each comprising user data;

reading search information located within at least one of the formatted data blocks located approximately along a centerline of the recorded tape; and determining a specific recording location on the tape from the search information read;

wherein the search information is recorded in at least one of the plurality of formatted data blocks located approximately along a centerline of the recorded tape, and the step of reading search information includes reading the search information of the formatted data block.

2. The method of claim 1, further comprising moving the tape in dependence on the determined specific recording location to a desired recording location.

3. The method of claim 1, wherein the search information is recorded in each of the plurality of formatted data blocks, and the step of reading search information includes reading the search information of at least one of the plurality of formatted data blocks located approximately along the centerline of the tape.

4. The method of claim 1, wherein the search information includes at least one of a complete user block count, a complete file mark count, and a complete set mark count.

5. The method of claim 4, wherein the search information further includes a format timing mark, a preamble, training information, and synchronization information, and the step of reading the search information includes the step of recognizing the format timing mark, synchronizing a clock based on the preamble, establishing byte boundaries based on the training information, and enabling processing of further search information in response to recognition of the synchronization information.

6. An arrangement for high speed scanning of a recorded tape comprising:

an arcuate scanner having at least one read head by which a recorded tape having a plurality of recorded arcuate tracks is passed in proximity, the read head making arcuate scans across the recorded tape, wherein at least one of the plurality of arcuate tracks includes a plurality of formatted data blocks each comprising user data;

a motor control for driving the recorded tape at read/write speed and at a scan speed higher than read/write speed;

a read channel coupled to the read head to receive signals from the read head, the read channel including a search information recovery circuit for detecting search information read from the recorded tape when the recorded tape is driven at the scan speed;

wherein the search information recovery circuit includes a format timing mark detector that detects a format timing mark in the search information, and wherein the search information is included in at least one of the plurality of formatted data blocks located approximately along the centerline of the recorded tape.

7. The arrangement of claim 6, wherein the search information recovery circuit further includes a data synchronizer responsive to a preamble in the search information to synchronize a recovery clock.

8. The arrangement of claim 7, wherein the search information recovery circuit further includes a code word boundary determiner that is responsive to training information in the search information to establish byte boundaries.

9. The arrangement of claim 8, wherein the search information recovery circuit includes a synchronization information detector that is responsive to synchronization information in the search information to enable receipt of further search information.

10. The arrangement of claim 7, wherein the read channel further includes a microprocessor, and wherein the further search information is at least one of a complete user block count, a complete file mark count, and a complete set mark count.

11. The arrangement of claim 6, wherein the search information includes at least one of a complete user block count, a complete file mark count, and a complete set mark count.

12. A method of recording data on a tape, comprising:

recording data in arcuate tracks across the tape with an arcuate scanner; and recording search information at approximately the center of each arcuate track;

wherein the step of recording data includes recording a plurality of formatted data blocks in each of the arcuate tracks, and the step of recording search information includes recording the search information in substantially each of the formatted data blocks, the formatted data block in approximately the center of each arcuate track containing the search information recorded at approximately the center of each arcuate track, and each formatted data block further includes user data.

* * * * *